United States Patent
Matsui et al.

(10) Patent No.: US 7,110,188 B2
(45) Date of Patent: Sep. 19, 2006

(54) SMALL IMAGING LENS AND IMAGING APPARATUS

(75) Inventors: Takumi Matsui, Hachioji (JP); Eigo Sano, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 10/852,817

(22) Filed: May 25, 2004

(65) Prior Publication Data

US 2004/0240080 A1    Dec. 2, 2004

(30) Foreign Application Priority Data

May 27, 2003    (JP)    ............................. 2003-148506

(51) Int. Cl.
  *G02B 13/18*    (2006.01)
  *G02B 3/02*    (2006.01)
  *G02B 13/04*    (2006.01)
  *G02B 9/00*    (2006.01)

(52) U.S. Cl. ........................ 359/714; 359/753; 359/754

(58) Field of Classification Search ................ 359/689, 359/716, 784, 791, 714, 753, 763, 768, 754, 359/769

See application file for complete search history.

(56) References Cited

U.S. PATENT DOCUMENTS 5,726,810 A * 3/1998 Meyers ........................ 359/684
RE35,775 E * 4/1998 Betensky et al. ........... 359/689
6,476,982 B1 11/2002 Kawakami

FOREIGN PATENT DOCUMENTS

JP    2002-228922    8/2002

* cited by examiner

*Primary Examiner*—Alicia M Harrington
(74) *Attorney, Agent, or Firm*—Cohen, Pontani, Lieberman & Pavane

(57) ABSTRACT

An imaging lens includes sequentially, from an object side, a first lens group, a second lens group, a third lens group, and a fourth lens group. The first lens group includes only a first lens having a meniscus shape with a concave surface facing the object side. The second lens group has positive refracting power as a whole and includes sequentially, from the object side, a second-first lens having positive refracting power and a second-second lens cemented to or separated from the second-first lens and having negative refracting power. The third lens group includes only a third lens having a meniscus shape with a concave surface facing the object side. The fourth lens group includes only a fourth lens.

22 Claims, 12 Drawing Sheets

F=2.88

—— d LINE
----- g LINE
-0.1  0  0.1

Y=3.58

—— S
----- M
-0.1  0  0.1

Y=3.58

-2%  0  2%

Y=3.58

—— d LINE
----- g LINE

Y=1.79

FIG. 6A  FIG. 6B  FIG. 6C
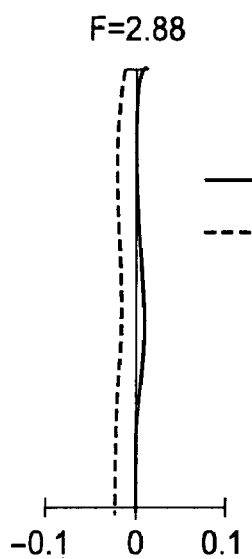
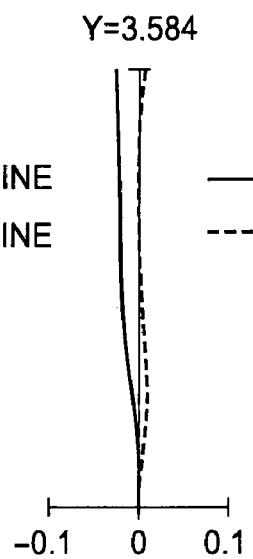
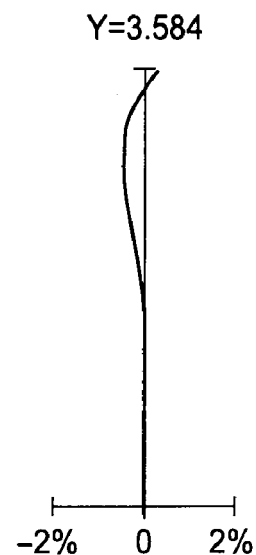
FIG. 6D
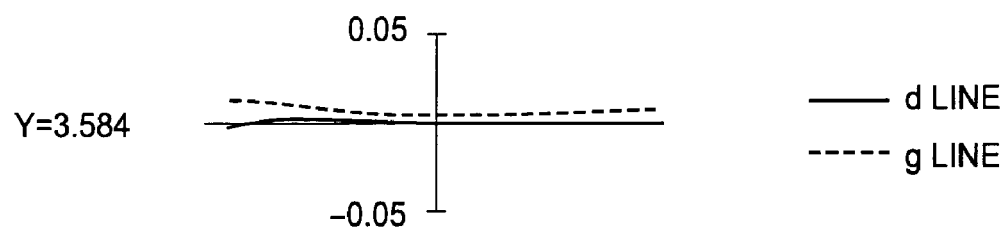
FIG. 6E
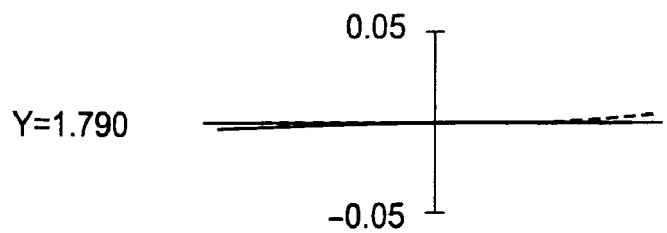

SMALL IMAGING LENS AND IMAGING APPARATUS

BACKGROUND OF THE INVENTION

1. Field of the Invention

The present invention relates to a small imaging lens for forming an optical image on a solid-state image sensing device such as a CCD type image sensor or CMOS type image sensor, and an imaging apparatus using the same.

2. Description of the Related Art

Imaging apparatuses using solid-state image sensing devices such as CCD (Charge-Coupled Device) type image sensors and CMOS (Complementary Metal-Oxide Semiconductor) type image sensors include digital still cameras, digital video cameras, and the like. Imaging apparatuses using such solid-state image sensing devices are suitable for miniaturization, and hence have recently been mounted in compact information terminals such as cellular phone sets. With increases in the miniaturization and pixel density of solid-state image sensing devices, demands have arisen for smaller and higher-performance imaging lenses to be mounted in these imaging apparatuses. As imaging lenses used for such an application, 4 element/3 group lenses each sequentially including, from the object side, an aperture stop, a first lens group having positive refracting power and including a cemented lens, a second lens group having an aspherical shape, and a third lens group having aspherical shape which are sequentially arranged from the object side is known, which are higher in performance than one or two element lenses. Among such lenses, a lens whose total length (the on-axis length from the aperture stop to the image-side focal point) is small, in particular, is disclosed in, for example, Japanese Patent Application Unexamined Publication (Kokai) No. 2002-228922.

The lens disclosed in Japanese Patent Application Unexamined Publication (Kokai) No. 2002-228922 is of a type which is designed to achieve miniaturization of an imaging lens by having an aperture stop placed nearest to the object side, a cemented lens as the first lens group which is constituted by positive and negative lenses, and aspherical lenses as the second and third lens groups, and letting the first lens group mainly contribute to the refracting power of the whole imaging lens system. However, as an imaging lens having such an arrangement, i.e., an arrangement in which a positive lens group having strong refracting power is placed near an aperture stop nearest to the object side, is reduced in total length, the exit pupil of the whole imaging lens system is brought near to the image-side focal plane, resulting in difficulty in obtaining good image-side telecentric characteristics. On the other hand, obtaining good image-side telecentric characteristics makes it difficult to perform aberration correction.

SUMMARY OF THE INVENTION

The present invention has been made in consideration of the above problems, and has as its object to provide a five element/four group imaging lens which is small in size, has undergone proper correction of various aberrations, and good image-side telecentric characteristics.

In order to achieve the above object, according to the first aspect of the present invention, there is provided an imaging lens comprising sequentially, from an object side, a first lens group, a second lens group, a third lens group, and a fourth lens group, the first lens group including only a first lens having a meniscus shapes with a concave surface facing the object side, the second lens group having positive refracting power as a whole and including sequentially, from the object side, a 2-1st lens having positive refracting power and a 2-2nd lens cemented or separated from the 2-1st lens and having negative refracting power, the third lens group including only a third lens having a meniscus shape with a concave surface facing the object side, and the fourth lens group including only a fourth lens.

According to the imaging lens described in the first aspect, in order to obtain a small imaging lens which has undergone proper correction of aberrations and has good image-side telecentric characteristics, the basic arrangement of the present invention includes sequentially, from the object side, the first lens having a meniscus shape with its concave surface facing the object side, the 2-1st and 2-2nd lenses which are cemented to or separated from each other and have positive refracting power and negative refracting power, respectively, the third lens having a meniscus shape with its concave surface facing the object side, and the fourth lens. This arrangement in which the first lens is placed on the object side of the second lens group having relatively high refracting power makes it easy to realize a compact imaging lens and ensure good image-side telecentric characteristics.

In aberration correction, forming the first lens into a meniscus shape with its concave surface facing the object side makes it possible to correct spherical aberration or coma caused in the second lens group having high refracting power. In addition, forming the second lens group having relatively high refracting power by using positive and negative lenses can suppress the occurrence of spherical aberration or coma. Forming the third lens into a meniscus shape with its concave surface facing the object side can properly correct coma, astigmatism, and distortion. Placing the fourth lens on the image side of the third lens can reduce the incident angle of a chief ray on the imaging plane near the peripheral portion of the screen.

Furthermore, letting the second lens group, in particular, among the respective lens groups have the highest positive refracting power makes it possible to realize a desired arrangement in terms of realizing miniaturization and aberration correction and obtaining good image-side telecentric characteristics.

According to the second aspect of the present invention, in the imaging lens described in the first aspect, the stop aperture is placed on the object side of the first lens group or between the first lens group and the second lens group.

According to the imaging lens described in the second aspect, placing the aperture stop on the object side of the first lens group can increase the distance from the image-side focal plane to the exit pupil of the whole imaging lens system. This makes it easy to ensure good-image-side telecentric characteristics. In addition, when a shutter unit is placed near the aperture stop, since the lens groups can be arranged on one side of the shutter unit, a lens holding member can be easily formed, and the size of the imaging apparatus can be easily reduced. Furthermore, placing the aperture stop between the first lens group and the second lens group makes it easy to miniaturize each lens group, and hence is suitable for miniaturization. Since lens groups are arranged on both sides of the aperture stop, off-axis aberrations such as coma and distortion can be effectively corrected.

According to the third aspect of the present invention, in the imaging lens described in the first or second aspect, the 2-1st lens has a biconvex shape, the 2-2nd lens has a biconcave shape, and each of the third lens and the fourth lens has at least one aspherical surface.

According to the imaging lens described in the third aspect, since the 2-1st lens with positive refracting power and the 2-2nd lens with negative refracting power, which constitute the second lens group, have a biconvex shape and a biconcave shape, respectively, the two lenses can be arranged in a small space, and spherical aberration, coma, astigmatism, and chromatic aberration can be properly corrected. Cementing the 2-1st lens to the 2-2nd lens, in particular, can correct on-axis and off-axis chromatic aberrations more effectively. Since the fourth lens is placed nearest to the image plane, on-axis and off-axis beams pass through the lens at different heights. Using an aspherical surface can therefore correct various aberrations on the peripheral portion of the screen without affecting the on-axis performance. Using an aspherical surface is especially effective in correcting curvature of field and distortion in a well-balanced manner while ensuring good image-side telecentric characteristics.

According to the fourth aspect of the present invention, in the imaging lens described in any one of the first to third aspects, the following inequality is satisfied:

$$0.5 < f12/f < 2.0 \quad (1)$$

where f12 is a composite focal length of the first lens group and the second lens group, and f is a focal length of a whole imaging lens system.

According to the imaging lens described in the fourth aspect, inequality (1) is a condition for properly setting the composite refracting power of the first and second lens groups. Exceeding the lower limit can ensure good image-side telecentric characteristics. On the other hand, falling below the upper limit makes it possible to ensure proper positive refracting power and reduce the total lens length.

According to the fifth aspect of the present invention, in the imaging lens described in any one of the first to fourth aspects, the following inequality is satisfied:

$$0.5 < f2/f < 4.0 \quad (2)$$

where f2 is a focal length of the second lens group, and f is a focal length of a whole imaging lens system.

According to the imaging lens described in the fifth aspect, inequality (2) is a condition for properly setting the refracting power of the second lens group. Exceeding the lower limit can ensure good image-side telecentric characteristics. On the other hand, falling below the upper limit makes it possible to ensure proper positive refracting power and reduce the total lens length.

According to the sixth aspect of the present invention, in the imaging lens described in any one of the first to fifth aspects, the following inequality is satisfied:

$$0.5 < f2/f < 3.0 \quad (3)$$

$$1.0 < TL/f < 2.5 \quad (4)$$

where f2 is a focal length of the second lens group, f is a focal length of a whole imaging lens system, and TL is a total length of the imaging lens (an on-axis distance from a lens surface located nearest to the object side to an image-side focal point of the whole image lens system or in an imaging lens having an aperture stop placed nearest to the object side, an on-axis distance from a surface of the aperture stop which is located nearest to the object side to an image-side focal point of the whole imaging lens system).

According to the imaging lens described in the sixth aspect, inequalities (3) and (4) are conditions for obtaining a small imaging lens which has undergone proper correction of aberrations and has good image-side telecentric characteristics.

Inequality (3) is a condition for properly setting the refracting power of the second lens group. Exceeding the lower limit can ensure good image-side telecentric characteristics. On the other hand, falling below the upper limit makes it is more preferable to ensure properly positive refracting power and reduce the total lens length.

Inequality (4) is a condition for properly setting the total length of the imaging lens. Exceeding the lower limit brings an advantage such that it becomes possible to locate a stop (diaphragm) position far from the imaging plane. As a consequence, the exit pupil of the imaging lens can be located far the image plane. This makes it easy to obtain good image-side telecentric characteristics. On the other hand, falling below the upper limit brings such an advantage as enabling to make the imaging lens small.

In this case, the total length of the imaging lens is the distance from the lens surface located nearest to the object side to the image-side focal point of the whole imaging lens system, or in an imaging lens having an aperture stop placed nearest to the object side, the on-axis distance from the surface of the aperture stop which is located nearest to the object side to the image-side focal point of the whole imaging lens system. In addition, when an optical member in the form of a parallel plate such as a low-pass filter is placed between the lens surface located nearest to the image side of the imaging lens and the image-side focal point, the total length is the distance satisfying inequality (3) upon conversion into an equivalent air distance.

According to the seventh aspect of the present invention, in the imaging lens described in any one of the first to sixth aspects, the following inequalities are satisfied:

$$40 < \nu 21 < 85 \quad (5)$$

$$20 < \nu 22 < 35 \quad (6)$$

where ν21 is an Abbe number of the 2-1st lens with respect to a d-line, and ν22 is an Abbe number of the 2-2nd lens with respect to a d-line.

According to the imaging lens described in the seventh aspect, inequalities (5) and (6) are conditions for properly setting the Abbe numbers of the 2-1st and 2-2nd lenses. Satisfying these conditions makes it possible to properly correct the chromatic aberration caused by the 2-1st lens with positive refracting power by using the 2-2nd lens with negative refracting power.

According to the eighth aspect of the present invention, in the imaging lens described in any one of the first to seventh aspects, the following inequalities are satisfied:

$$0.0 < 2Y/EP < 1.5 \quad (7)$$

where 2Y is an effective screen diagonal length of the solid-state image sensing device, and EP is an on-axis distance from an exit pupil of the whole imaging lens system to an image-side focal point of the whole imaging lens system.

According to the imaging lens described in the eighth aspect, inequality (7) is a condition for obtaining good image-side telecentric characteristics. Falling below the upper limit can ensure a sufficient distance from the exit pupil to the image-side focal point of the whole imaging lens system, and hence makes it easy to obtain good image-side telecentric characteristics. On the other hand, exceeding the lower limit brings such an advantage as enabling to obtain the good image-side telecentric characteristics.

According to the ninth aspect of the present invention, in the imaging lens described in any one of the first to eighth aspects, each of lenses forming the first lens group, the third lens group, and the fourth lens group includes at least one aspherical surface.

According to the imaging lens described in the ninth aspect, making each lens constituting the first lens group have at least one aspherical surface can effectively correct spherical aberration and coma. Making each lens constituting the third lens group have at least one aspherical surface can mainly correct curvature of field effectively. Making each lens constituting the fourth lens group have at least one aspherical surface makes it easy to correct distortion and can realize an arrangement which can easily obtain good image-side telecentric characteristics. Making each lens constituting the second lens group with relatively high refracting power have at least one aspherical surface can effectively correct the aberrations of the whole imaging lens.

According to the 10th aspect of the present invention, there is provided an imaging apparatus including the imaging lens described in any one of the first to ninth aspects.

According to the imaging lens described in the 10th aspect, a compact, high-performance imaging apparatus can be obtained by using the imaging lens of the present invention.

The above and many other objects, features and advantages of the present invention will become manifest to those skilled in the art upon making reference to the following detailed description and accompanying drawings in which preferred embodiment incorporating the principle of the present invention are shown by way of illustrative examples.

BRIEF DESCRIPTION OF THE DRAWINGS

FIGS. 4A to 4E are aberration diagrams showing spherical aberration (FIG. 4A), astigmatism (FIG. 4B), distortion (FIG. 4C), and coma (FIGS. 4D and 4E) in the second embodiment shown in FIG. 3;

FIGS. 6A to 6E are aberration diagrams showing spherical aberration (FIG. 6A), astigmatism (FIG. 6B), distortion (FIG. 6C), and coma (FIGS. 6D and 6E) in the third embodiment shown in FIG. 5;

DETAILED DESCRIPTION OF THE PREFERRED EMBODIMENTS

Figure 1:
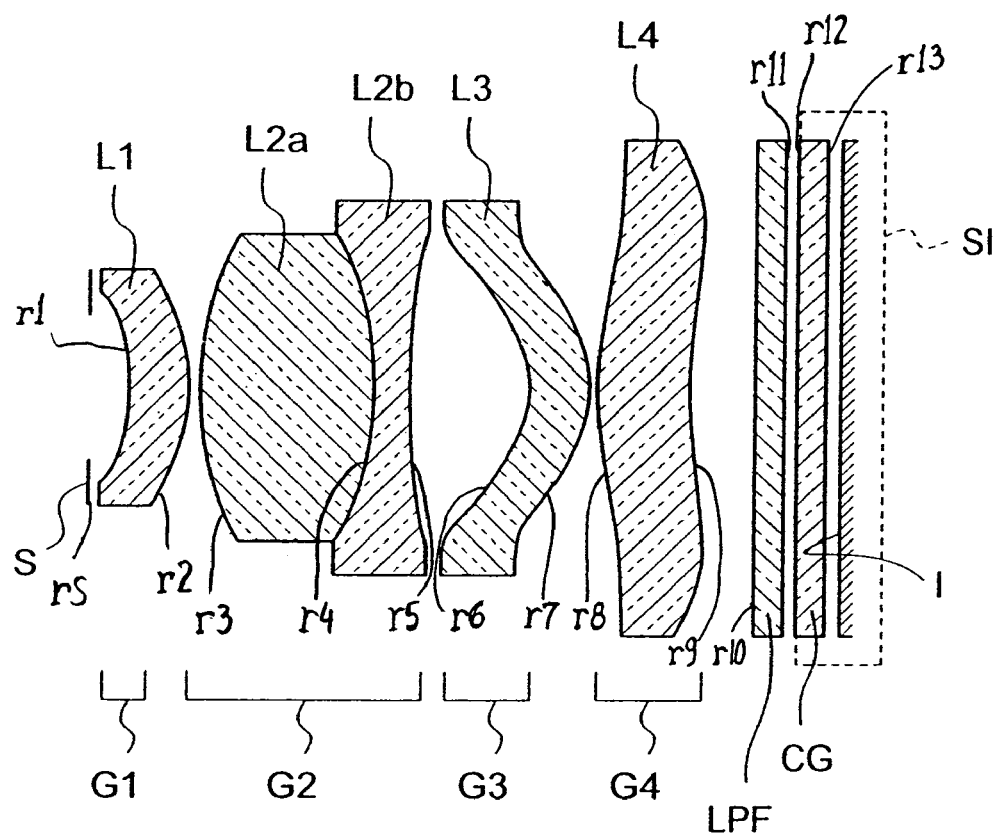
FIG. 1 is a sectional view of an imaging apparatus including an imaging lens according to the first embodiment of the present invention, which is taken along the optical axis direction.
Figure 2A:
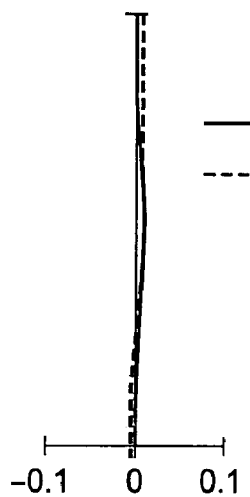
FIGS. 2A to 2E are aberration diagrams showing spherical aberration (FIG. 2A), astigmatism (FIG. 2B), distortion (FIG. 2C), and coma (FIGS. 2D and 2E) in the first embodiment shown in FIG. 1.
Figure 2B:
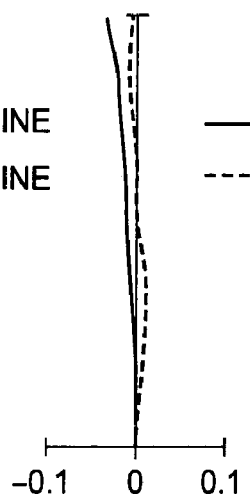
Figure 2C:
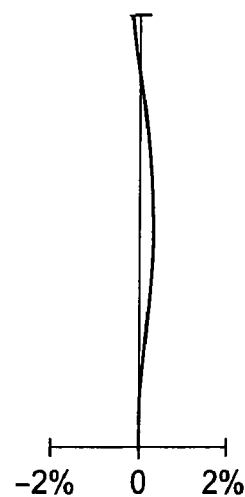
Figure 2D:
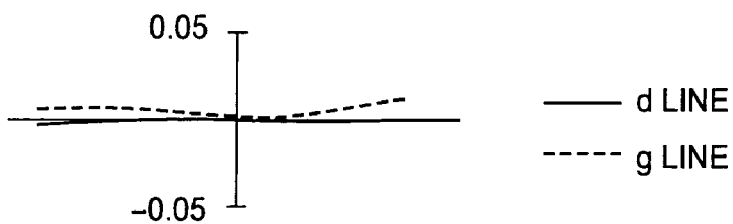
Figure 2E:
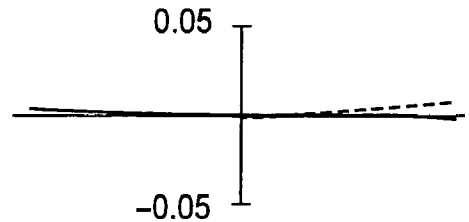

Several preferred embodiments of the present invention will be described below with reference to the accompanying drawings.

In the present invention, a "plastic lens" includes a lens which is formed from a material obtained by dispersing small-diameter particles in a plastic material serving as a base material, and has a plastic volume ratio of 1/2 or more, and also includes a lens whose surface is coated to prevent reflection or increase surface hardness.

Imaging lenses having wide imaging angles of view are often required for imaging apparatuses mounted on cellular phone sets and compact information terminals. For example, a user uses such an imaging apparatus to image himself/herself as an object to be imaged while holding the imaging apparatus or information equipment on which the imaging apparatus is mounted and stretching out his/her arm. The angle of view suitable for such imaging operation is about 60° or more. When an imaging apparatus has a so-called digital zoom function of changing an apparent imaging range by partially enlarging/displaying a digital image obtained by imaging, the imaging lens preferably has as wide an imaging angle of view as possible. In this specification, therefore, a wide-angle imaging lens means a lens which has a focal length of 38 mm or less, more preferably, about 35 mm, in terms of the focal length of an imaging lens compatible with 35 mm films, and has an angle of view of 60° or more.

An imaging lens used for an imaging apparatus having a solid-state image sensing device is required to be telecentric so as to obtain good light-receiving sensitivity throughout the angle of view. The expression "image-side telecentric" means that a chief ray is incident on the imaging plane of the solid-state image sensing device at an angle parallel to the optical axis. Recently, in general, a substantially image-side telecentric imaging lens which causes light to be incident at an angle of about 5 to 30° on a peripheral portion of the imaging plane is used because the unsatisfactory amount of image-side telecentricity can be corrected by properly arranging a microlens array on the imaging plane of the solid-state image sensing device. In this case, in order to obtain good light-receiving sensitivity and image quality throughout a frame, the lens preferably has substantially image-side telecentric characteristics in which the incident angle of a chief ray on the imaging plane uniformly increases with respect to image height. In this specification, the expression "good image-side telecentric" means that the incident angle of a chief ray uniformly increases with respect to image height, and is about 20° or less on the most peripheral portion of the imaging plane.

The following are the symbols which are used for the description of an imaging lens according to each embodiment:

f: Focal length of whole imaging lens f12: A composite focal length of the first lens group and the second lens group f2: A focal length of the second lens group TL: A total length of the imaging lens (an on-axis distance from a lens surface located nearest to the object side to an image-side focal point of the whole image lens system or in an imaging lens having an aperture stop placed nearest to the object side, an on-axis distance from a surface of the aperture stop which is located nearest to the object side to an image-side focal point of the whole imaging lens system).

F: F-number

2Y: Effective frame diagonal length (Rectangular effective pixel area diagonal length on imaging plane of solid-state image sensing device)

EP: An on-axis distance from an exit pupil of the whole imaging lens system to an image-side focal point of the whole imaging lens system 2ω: Angle of view r: Radius of curvature d: On-axis surface interval nd: Refractive index of lens material with respect to d-line vd: Abbe number of lens material with respect to d-line The imaging lens according to embodiments of the present invention satisfies $$0.5 < (f2/f) < 3.0$$

$$(TL/f) < 2.5$$

where f2 is the focal length of a second lens group L2, and TL is the total length of the imaging lens (the on-axis distance from the lens surface located nearest to the object side to the image-side focal point of the whole image lens system or in an imaging lens having an aperture stop S placed nearest to the object side, the on-axis distance from the surface of the aperture stop S which is located nearest to the object side to the image-side focal point of the whole imaging lens system). In addition, the imaging lens according to each embodiment satisfies the following inequality with respect to a solid-state image sensing device CCD:

$$(2Y/EP) < 1.5$$

where EP is the on-axis distance from the exit pupil of the whole imaging lens system to the image-side focal point of the whole imaging lens system.

Furthermore, in each embodiment, in an orthogonal coordinate system in which a surface vertex is set as an origin, and the optical axis direction is set as the X-axis, letting C be a vertex curvature, K be a cone constant, and $A_4$, $A_6$, $A_8$, $A_{10}$, and $A_{12}$ be aspherical surface coefficients, an aspherical surface shape is represented by $$X = \frac{Ch^2}{1+\sqrt{1-(1+K)C^2h^2}} + A_4h^4 + A_6h^6 + A_8h^8 + A_{10}h^{10} + A_{12}h^{12}$$

$$\text{for } h = \sqrt{Y^2 + Z^2}$$

(First Embodiment)

FIG. 1 is a sectional view of an imaging apparatus including an imaging lens according to the first embodiment of the present invention which is taken along the optical axis direction. Referring to FIG. 1, the imaging lens sequentially includes, from the object side, an aperture stop S, first lens group G1, second lens group G2, third lens group G3, and fourth lens group G4. The first lens group G1 is comprised of only a first lens L1 having a meniscus shape with its concave surface facing the object side. The second lens group G2 has positive refracting power as a whole, and sequentially includes, from the object side, a 2-1st lens L2a having positive refracting power and a 2-2nd lens L2b cemented to the 2-1st lens L2a and having negative refracting power. The third lens group G3 is comprised of only a third lens L3 having a meniscus shape with its concave surface facing the object side. The fourth lens group G4 is comprised of only a fourth lens L4.

The image sensing device is comprised of this imaging lens, an optical low-pass filter LPF (with an infrared cut coating formed on the object-side surface), a cover glass (parallel plate) CG of a solid-state image sensing device IS, and the solid-state image sensing device IS such as a CMOS or CCD.

An optical image which has passed through the imaging lens, an infrared cut filter IRCF, the cover glass CG of the solid-state image sensing device IS and formed on an imaging plane I is photoelectrically converted by the solid-state image sensing device IS and further subjected to predetermined processing to be converted into an image signal.

As is obvious from FIG. 1, the 2-1st lens L2a has a biconvex shape, the 2-2nd lens L2b has a biconcave shape, and each of the third lens L3 and fourth lens L4 has at least one aspherical surface.

In the imaging lens suitable for the imaging apparatus according to the first embodiment shown in FIG. 1, a focal length f, an F-number F, and a value 2ù of an angle of view are set as follows:

Focal length: f=6.30

F-number: 2.88

Angle of view: 2ω=61.6°

Table 1 shows the lens data of the imaging lens according to the first embodiment. FIGS. 2A to 2E are aberration diagrams showing the spherical aberration (FIG. 2A), astigmatism (FIG. 2B), distortion (FIG. 2C), and coma (FIGS. 2D and 2E) of the first embodiment. In the first embodiment, the first lens L1, third lens L3, and fourth lens L4 are made of a polyolefin-based material. Each lens has a saturation water absorption of 0.01% or less. The 2-1st lens L2a and 2-2nd lens L2b are made of a glass material and cemented to each other.

TABLE 1

|  | r | d | nd | vd |
|---|---|---|---|---|
| Stop | ∞ | 0.60 | | |
| 1 | −2.514 | 0.91 | 1.53 | 56.5 |
| 2 | −2.715 | 0.91 | | |
| 3 | 4.432 | 2.66 | 1.77 | 49.6 |
| 4 | −4.432 | 0.50 | 1.76 | 26.5 |
| 5 | 10.250 | 1.75 | | |
| 6 | −1.649 | 0.85 | 1.53 | 56.5 |
| 7 | −1.910 | 0.12 | | |
| 8 | 4.047 | 1.37 | 1.53 | 56.5 |
| 9 | 4.846 | 0.94 | | |
| 10 | ∞ | 0.40 | 1.52 | 64.1 |
| 11 | ∞ | 0.20 | | |

TABLE 1-continued

| | r | d | nd | vd |
|---|---|---|---|---|
| 12 | ∞ | 0.50 | 1.52 | 64.1 |
| 13 | ∞ | | | |

Aspherical Surface Coefficient

First Surface $K=-1.03519$ $A_4=-3.55537\times10^{-3}$ $A_6=5.81213\times10^{-4}$ $A_8=-3.74306\times10^{-4}$ Second Surface $K=0.281810$ $A_4=6.18879\times10^{-3}$ $A_6=5.08475\times10^{-4}$ $A_8=8.66009\times10^{-5}$ Sixth Surface $K=-2.98740$ $A_4=-3.15591\times10^{-2}$ $A_6=3.79820\times10^{-3}$ $A_8=6.53416\times10^{-4}$ $A_{10}=-8.97509\times10^{-5}$ Seventh Surface $K=-0.790189$ $A_4=6.20505\times10^{-3}$ $A_6=-7.73298\times10^{-4}$ $A_8=7.54994\times10^{-4}$ $A_{10}=-4.49740\times10^{-5}$ Eighth Surface $K=-6.65236$ $A_4=-1.12554\times10^{-2}$ $A_6=1.65662\times10^{-3}$ $A_8=-1.63542\times10^{-4}$ $A_{10}=8.15485\times10^{-6}$ $A_{12}=-1.36384\times10^{-7}$ Ninth Surface $K=-0.229448$ $A_4=-1.77246\times10^{-2}$ $A_6=1.31178\times10^{-3}$ $A_8=-7.71080\times10^{-5}$ $A_{10}=1.51689\times10^{-6}$ $A_{12}=8.00982\times10^{31\ 9}$ (Second Embodiment)

Figure 3:
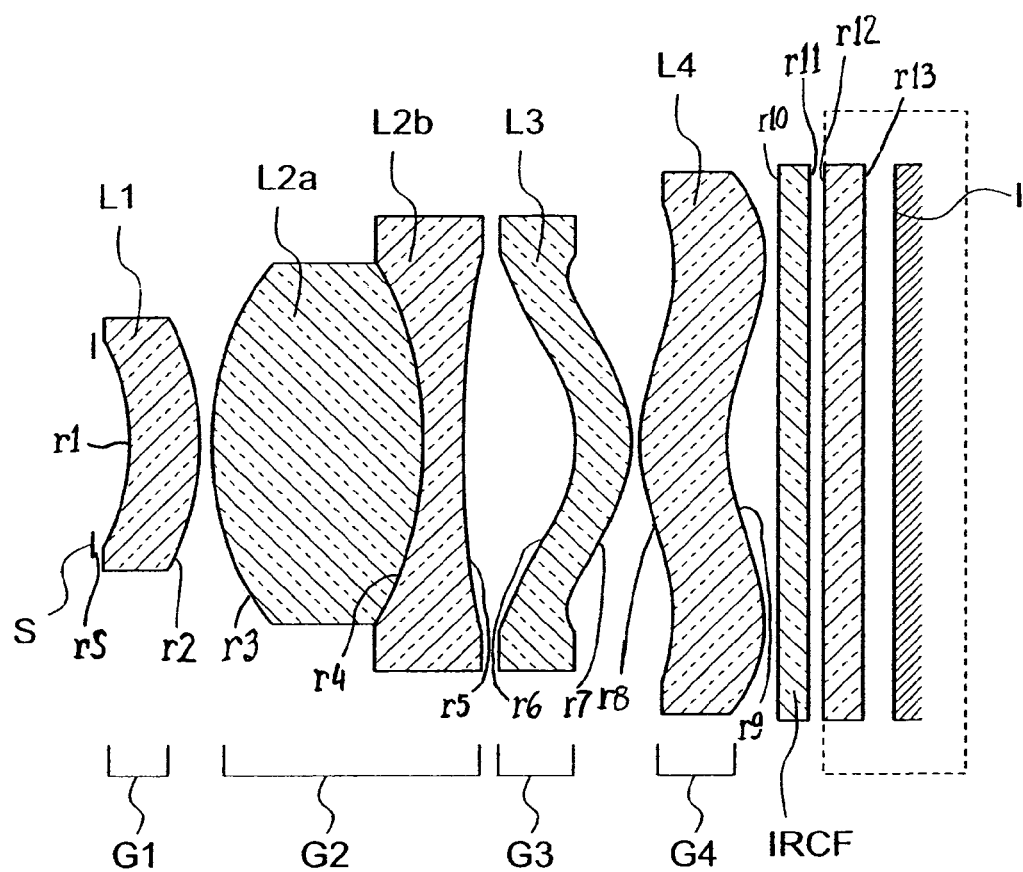
FIG. 3 is a sectional view of an imaging apparatus including an imaging lens according to the second embodiment of the present invention, which is taken along the optical axis direction.
Figure 4A:
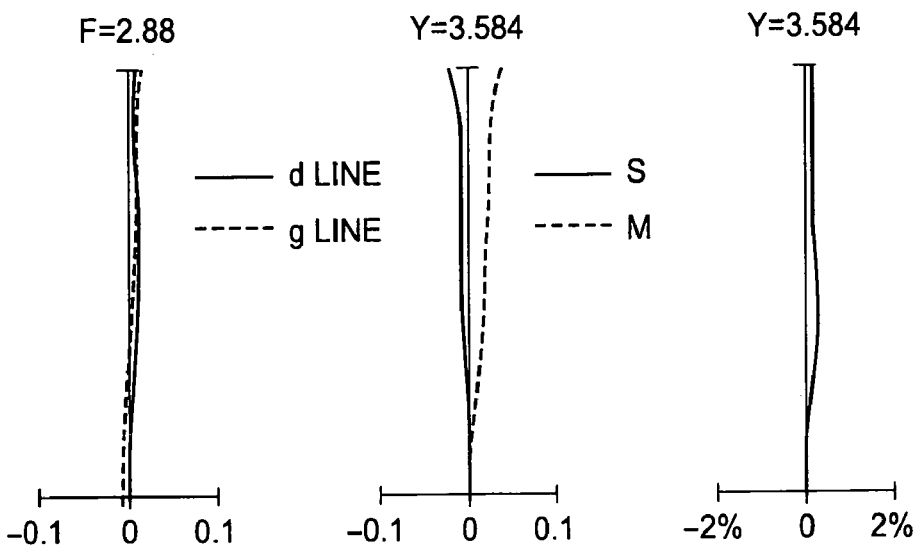
Figure 4D:
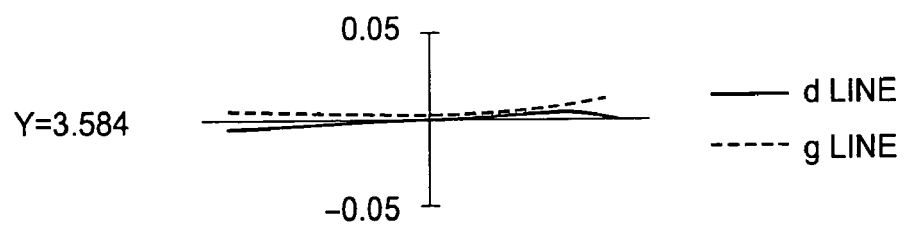
Figure 4E:
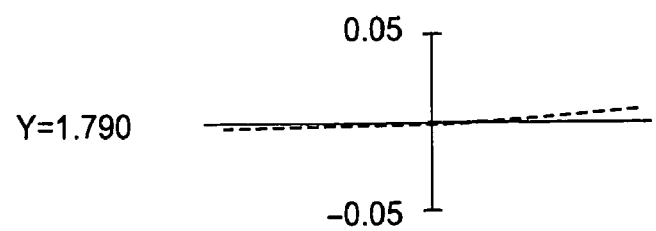

FIG. 3 is a sectional view of an imaging apparatus including an imaging lens according to the second embodiment of the present invention which is taken along the optical axis direction. Referring to FIG. 3, the imaging lens sequentially includes, from the object side, an aperture stop S, first lens group G1, second lens group G2, third lens group G3, and fourth lens group G4. The first lens group G1 is comprised of only a first lens L1 having a meniscus shape with its concave surface facing the object side. The second lens group G2 has positive refracting power as a whole, and sequentially includes, from the object side, a 2-1st lens L2a having positive refracting power and a 2-2nd lens L2b cemented to the 2-1st lens L2a and having negative refracting power. The third lens group G3 is comprised of only a third lens L3 having a meniscus shape with its concave surface facing the object side. The fourth lens group G4 is comprised of only a fourth lens L4.

The image sensing device is comprised of this imaging lens, an infrared cut filter IRCF which is placed on the image side of the imaging lens and has an infrared cut coating formed on the object-side surface, a cover glass (parallel plate) CG of a solid-state image sensing device IS, and the solid-state image sensing device IS such as a CMOS or CCD.

An optical image which has passed through the imaging lens, the infrared cut filter IRCF, the cover glass CG of the solid-state image sensing device IS and formed on an imaging plane I is photoelectrically converted by the solid-state image sensing device IS and further subjected to predetermined processing to be converted into an image signal.

In the imaging lens suitable for the imaging apparatus according to the second embodiment shown in FIG. 3, a focal length f, an F-number F, and a value $2ù$ of an angle of view are set as follows:

Focal length: f=5.80

F-number: 2.88

Angle of view: 2ω=63.3°

Table 2 shows the lens data of the imaging lens according to the second embodiment. FIGS. 4A to 4E are aberration diagrams showing the spherical aberration (FIG. 4A), astigmatism (FIG. 4B), distortion (FIG. 4C), and coma (FIGS. 4D and 4E) of the second embodiment. In the second embodiment, the first lens L1, third lens L3, and fourth lens L4 are made of a polyolefin-based material. Each lens has a saturation water absorption of 0.01% or less. The 2-1st lens L2a and 2-2nd lens L2b are made of a glass material and cemented to each other.

TABLE 2

| | r | d | nd | vd |
|---|---|---|---|---|
| Stop | ∞ | 0.60 | | |
| 1 | -2.814 | 0.95 | 1.52500 | 56.0 |
| 2 | -3.144 | 0.15 | | |
| 3 | 4.462 | 2.83 | 1.77250 | 49.6 |
| 4 | -4.618 | 0.50 | 1.80518 | 25.4 |
| 5 | 14.680 | 1.49 | | |
| 6 | -1.960 | 0.75 | 1.52500 | 56.0 |
| 7 | -2.144 | 0.13 | | |
| 8 | 2.596 | 1.14 | 1.52500 | 56.0 |
| 9 | 2.472 | 0.70 | | |
| 10 | ∞ | 0.40 | 1.51633 | 64.1 |

TABLE 2-continued

| r | d | nd | vd |
|---|---|---|---|
| 11 | ∞ | 0.20 | | |
| 12 | ∞ | 0.50 | 1.51633 | 64.1 |
| 13 | ∞ | | | |

Aspherical Surface Coefficient

First Surface $K = -1.25351$ $A_4 = -1.68911 \times 10^{-3}$ $A_6 = 1.57465 \times 10^{-3}$ $A_8 = -6.30922 \times 10^{-4}$ Second Surface $K = 1.07838$ $A_4 = 9.37717 \times 10^{-3}$ $A_6 = 8.77040 \times 10^{-4}$ $A_8 = 1.91749 \times 10^{-4}$ Sixth Surface $K = -5.21457$ $A_4 = -2.04464 \times 10^{-2}$ $A_6 = 1.47434 \times 10^{-3}$ $A_8 = 6.58073 \times 10^{-4}$ $A_{10} = -7.33828 \times 10^{-5}$ Seventh Surface $K = -8.91784 \times 10^{-1}$ $A_4 = 7.24200 \times 10^{-3}$ $A_6 = -1.42056 \times 10^{-3}$ $A_8 = 7.60386 \times 10^{-4}$ $A_{10} = -4.27735 \times 10^{-5}$ Eighth Surface $K = -4.61907$ $A_4 = -1.71115 \times 10^{-2}$ $A_6 = 1.86744 \times 10^{-3}$ $A_8 = -1.63542 \times 10^{-4}$ $A_{10} = -1.92926 \times 10^{-6}$ $A_{12} = 3.53433 \times 10^{-7}$ Ninth Surface $K = -2.80562$ $A_4 = -2.07584 \times 10^{-2}$ $A_6 = 2.39274 \times 10^{-3}$ $A_8 = -1.96469 \times 10^{-4}$ $A_{10} = 8.11351 \times 10^{-6}$ $A_{12} = -1.42309 \times 10^{-7}$ (Third Embodiment)

Figure 5:
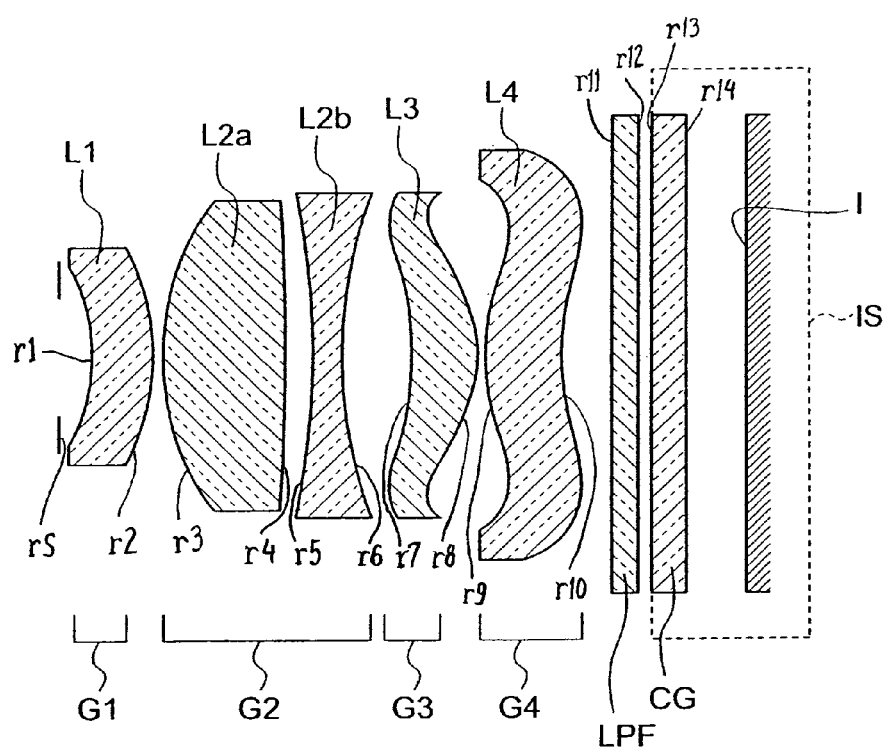
FIG. 5 is a sectional view of an imaging apparatus including an imaging lens according to the third embodiment of the present invention, which is taken along the optical axis direction.

FIG. 5 is a sectional view of an imaging apparatus including an imaging lens according to the third embodiment of the present invention which is taken along the optical axis direction. Referring to FIG. 5, the imaging lens sequentially includes, from the object side, an aperture stop S, first lens group G1, second lens group G2, third lens group G3, and fourth lens group G4. The first lens group G1 is comprised of only a first lens L1 having a meniscus shape with its concave surface facing the object side. The second lens group G2 has positive refracting power as a whole, and sequentially includes, from the object side, a 2-1st lens L2a having positive refracting power and a 2-2nd lens L2b having negative refracting power. The third lens group G3 is comprised of only a third lens L3 having a meniscus shape with its concave surface facing the object side. The fourth lens group G4 is comprised of only a fourth lens L4.

The image sensing device is comprised of this imaging lens, an infrared cut filter IRCF having an infrared cut coating formed on the object-side surface, a cover glass (parallel plate) CG of a solid-state image sensing device IS, and the solid-state image sensing device IS such as a CMOS or CCD.

An optical image which has passed through the imaging lens, the infrared cut filter IRCF, the cover glass CG of the solid-state image sensing device IS and formed on an imaging plane I is photoelectrically converted by the solid-state image sensing device IS and further subjected to predetermined processing to be converted into an image signal.

In the imaging lens suitable for the imaging apparatus according to the third embodiment shown in FIG. 5, a focal length f, an F-number F, and a value $2\overline{\omega}$ of an angle of view are set as follows:

Focal length: f=6.30

F-number: 2.88

Angle of view: 2ω=58.9°

Table 3 shows the lens data of the imaging lens according to the third embodiment. FIGS. 6A to 6E are aberration diagrams showing the spherical aberration (FIG. 6A), astigmatism (FIG. 6B), distortion (FIG. 6C), and coma (FIGS. 6D and 6E) of the third embodiment. In the third embodiment, the first lens L1, third lens L3, and fourth lens L4 are made of a polyolefin-based material. Each lens has a saturation water absorption of 0.01% or less. The 2-1st lens L2a and 2-2nd lens L2b are made of a glass material. Note that a certain degree of freedom in design can be obtained by placing the 2-1st lens L2a and 2-2nd lens L2b through an air gap, thereby providing an imaging lens whose aberration is properly corrected.

TABLE 3

| | r | d | nd | vd |
|---|---|---|---|---|
| Stop | ∞ | 0.60 | | |
| 1 | -3.287 | 0.87 | 1.52500 | 56.0 |
| 2 | -3.036 | 0.15 | | |
| 3 | 4.365 | 1.90 | 1.72916 | 54.7 |
| 4 | -44.173 | 0.40 | | |
| 5 | -15.306 | 0.50 | 1.84666 | 23.8 |
| 6 | 7.825 | 1.07 | | |

TABLE 3-continued

| | r | d | nd | vd |
|---|---|---|---|---|
| 7 | −3.134 | 0.98 | 1.52500 | 56.0 |
| 8 | −2.506 | 0.15 | | |
| 9 | 2.780 | 1.14 | 1.52500 | 56.0 |
| 10 | 2.618 | 0.80 | | |
| 11 | ∞ | 0.40 | 1.51633 | 64.1 |
| 12 | ∞ | 0.20 | | |
| 13 | ∞ | 0.50 | 1.51633 | 64.1 |
| 14 | ∞ | | | |

Aspherical Surface Coefficient

First Surface $K=-3.05642\times10^{-1}$ $A_4=-2.98965\times10^{-3}$ $A_6=3.10073\times10^{-4}$ $A_8=-2.67448\times10^{-4}$ Second Surface $K=1.01932$ $A_4=6.28597\times10^{-3}$ $A_6=4.04744\times10^{-4}$ $A_8=3.21098\times10^{-4}$ Seventh Surface $K=-1.07929\times10^{-1}$ $A_4=-3.98930\times10^{-3}$ $A_6=4.58759\times10^{-4}$ $A_8=4.42081\times10^{-4}$ $A_{10}=-3.98104\times10^{-5}$ Eighth Surface $K=-9.24250\times10^{-1}$ $A_4=6.28580\times10^{-3}$ $A_6=-1.40644\times10^{-3}$ $A_8=5.97312\times10^{-4}$ $A_{10}=-2.28510\times10^{-5}$ Ninth Surface $K=-1.40422$ $A_4=-2.98774\times10^{-2}$ $A_6=2.32324\times10^{-3}$ $A_8=-2.01577\times10^{-4}$ $A_{10}=2.03334\times10^{-5}$ $A_{12}=-2.07595\times10^{-6}$ Tenth Surface $K=-2.54214$ $A_4=-2.55937\times10^{-2}$ $A_6=2.32027\times10^{-3}$ $A_8=-1.98484\times10^{-4}$ $A_{10}=1.13675\times10^{-5}$ $A_{12}=-4.39802\times10^{-7}$ (Fourth Embodiment)

Figure 7:
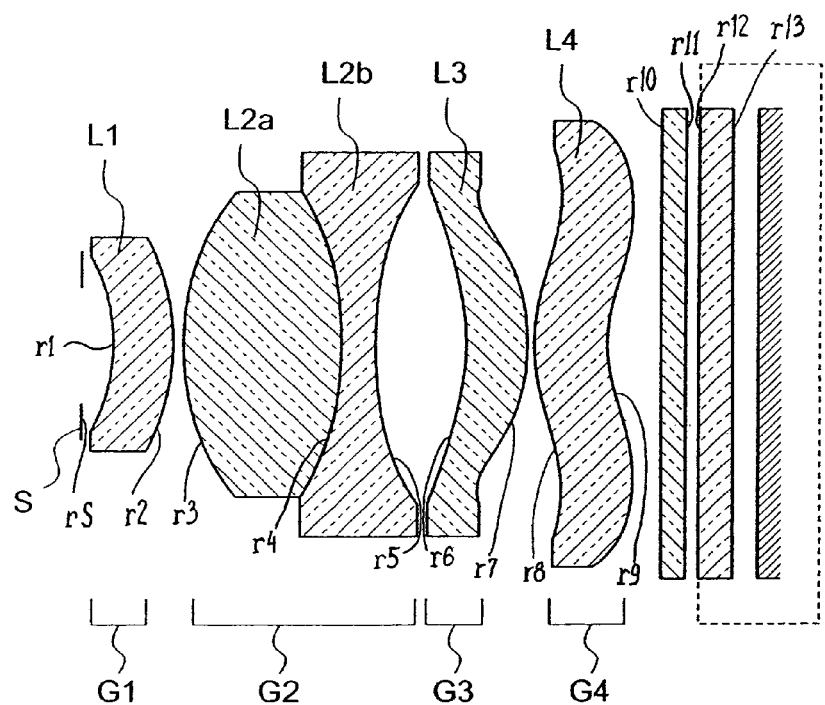
FIG. 7 is a sectional view of an imaging apparatus including an imaging lens according to the fourth embodiment of the present invention, which is taken along the optical axis direction.
Figures 8A, 8B, 8C:
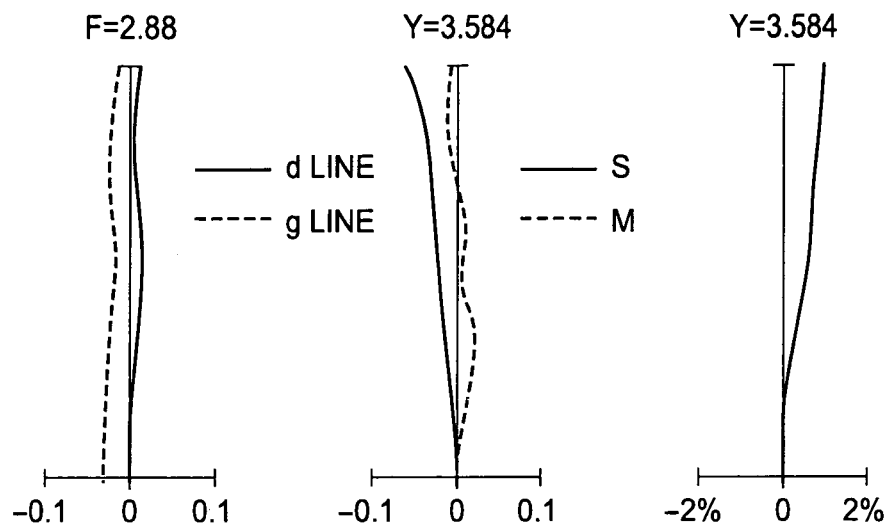
FIGS. 8A to 8E are aberration diagrams showing spherical aberration (FIG. 8A), astigmatism (FIG. 8B), distortion (FIG. 8C), and coma (FIGS. 8D and 8E) in the fourth embodiment shown in FIG. 7.
Figure 8D:
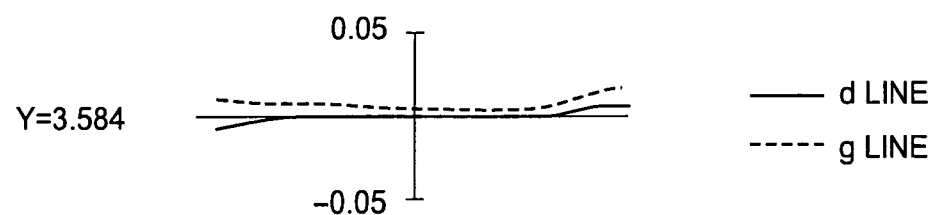
Figure 8E:
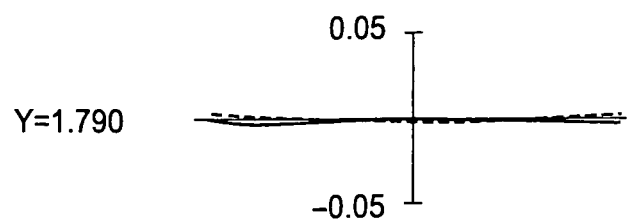

FIG. 7 is a sectional view of an imaging apparatus including an imaging lens according to the fourth embodiment of the present invention which is taken along the optical axis direction. Referring to FIG. 7, the imaging lens sequentially includes, from the object side, an aperture stop S, first lens group G1, second lens group G2, third lens group G3, and fourth lens group G4. The first lens group G1 is comprised of only a first lens L1 having a meniscus shape with its concave surface facing the object side. The second lens group G2 has positive refracting power as a whole, and sequentially includes, from the object side, a 2-1st lens L2a having positive refracting power and a 2-2nd lens L2b cemented to the 2-1st lens L2a and having negative refracting power. The third lens group G3 is comprised of only a third lens L3 having a meniscus shape with its concave surface facing the object side. The fourth lens group G4 is comprised of only a fourth lens L4.

The image sensing device is comprised of this imaging lens, an infrared cut filter IRCF having an infrared cut coating formed on the object-side surface, a cover glass (parallel plate) CG of a solid-state image sensing device IS, and the solid-state image sensing device IS such as a CMOS or CCD.

An optical image which has passed through the imaging lens, the infrared cut filter IRCF, the cover glass CG of the solid-state image sensing device IS and formed on an imaging plane I is photoelectrically converted by the solid-state image sensing device IS and further subjected to predetermined processing to be converted into an image signal.

In the imaging lens suitable for the imaging apparatus according to the fourth embodiment shown in FIG. 7, a focal length f, an F-number F, and a value $2\bar{u}$ of an angle of view are set as follows:

Focal length: f=6.30

F-number: 2.88

Angle of view: 2ω=58.3°

Table 4 shows the lens data of the imaging lens according to the fourth embodiment. FIGS. 8A to 8E are aberration diagrams showing the spherical aberration (FIG. 8A), astigmatism (FIG. 8B), distortion (FIG. 8C), and coma (FIGS. 8D and 8E) of the fourth embodiment. In the fourth embodiment, the first lens L1, 2-1st lens L2a, third lens L3, and fourth lens L4 are made of a polyolefin-based material. Each lens has a saturation water absorption of 0.01% or less. The 2-2nd lens L2b is made of a polycarbonate-based plastic material, and has a saturation water absorption of 0.4% or less. Forming all the lenses constituting the imaging lens using plastic materials makes it possible to provide a low-cost imaging lens and imaging apparatus which are suitable for mass production.

TABLE 4

| | r | d | nd | vd |
|---|---|---|---|---|
| Stop | ∞ | 0.60 | | |
| 1 | −2.662 | 0.87 | 1.52500 | 56.0 |
| 2 | −2.311 | 0.15 | | |
| 3 | 3.813 | 2.54 | 1.52500 | 56.0 |
| 4 | −5.000 | 0.50 | 1.58300 | 30.0 |
| 5 | 5.123 | 1.42 | | |
| 6 | −2.848 | 0.98 | 1.52500 | 56.0 |
| 7 | −2.591 | 0.13 | | |
| 8 | 2.656 | 1.14 | 1.52500 | 56.0 |
| 9 | 2.719 | 0.80 | | |
| 10 | ∞ | 0.40 | 1.51633 | 64.1 |
| 11 | ∞ | 0.20 | | |
| 12 | ∞ | 0.50 | 1.51633 | 64.1 |
| 13 | ∞ | | | |

Aspherical Surface Coefficient

First Surface $K = -3.21639 \times 10^{-1}$ $A_1 = -9.13238 \times 10^{-3}$ $A_2 = -2.83488 \times 10^{-4}$ $A_3 = -5.02857 \times 10^{-4}$ Second Surface $K = 2.26939 \times 10^{-1}$ $A_1 = 4.46173 \times 10^{-3}$ $A_2 = 5.34727 \times 10^{-5}$ $A_3 = 4.21331 \times 10^{-4}$ Sixth Surface $K = -1.15027 \times 10^{-1}$ $A_1 = -1.27207 \times 10^{-2}$ $A_2 = 2.10276 \times 10^{-3}$ $A_3 = 3.34485 \times 10^{-4}$ $A_4 = -5.16026 \times 10^{-5}$ Seventh Surface $K = -3.18976 \times 10^{-1}$ $A_1 = 1.24284 \times 10^{-3}$ $A_2 = 2.46067 \times 10^{-4}$ $A_3 = 5.82625 \times 10^{-4}$ $A_4 = -3.45678 \times 10^{-5}$ Eighth Surface $K = -3.30939$ $A_1 = -2.50624 \times 10^{-2}$ $A_2 = 2.93116 \times 10^{-3}$ $A_3 = -1.66739 \times 10^{-4}$ $A_4 = 3.26151 \times 10^{-6}$ $A_5 = 3.34171 \times 10^{-8}$ Ninth Surface $K = -9.91016 \times 10^{-1}$ $A_1 = -3.09691 \times 10^{-2}$ $A_2 = 2.50952 \times 10^{-3}$ $A_3 = -1.42189 \times 10^{-4}$ $A_4 = 4.77385 \times 10^{-6}$ $A_5 = -1.04918 \times 10^{-7}$ (Fifth Embodiment)

Figure 9:
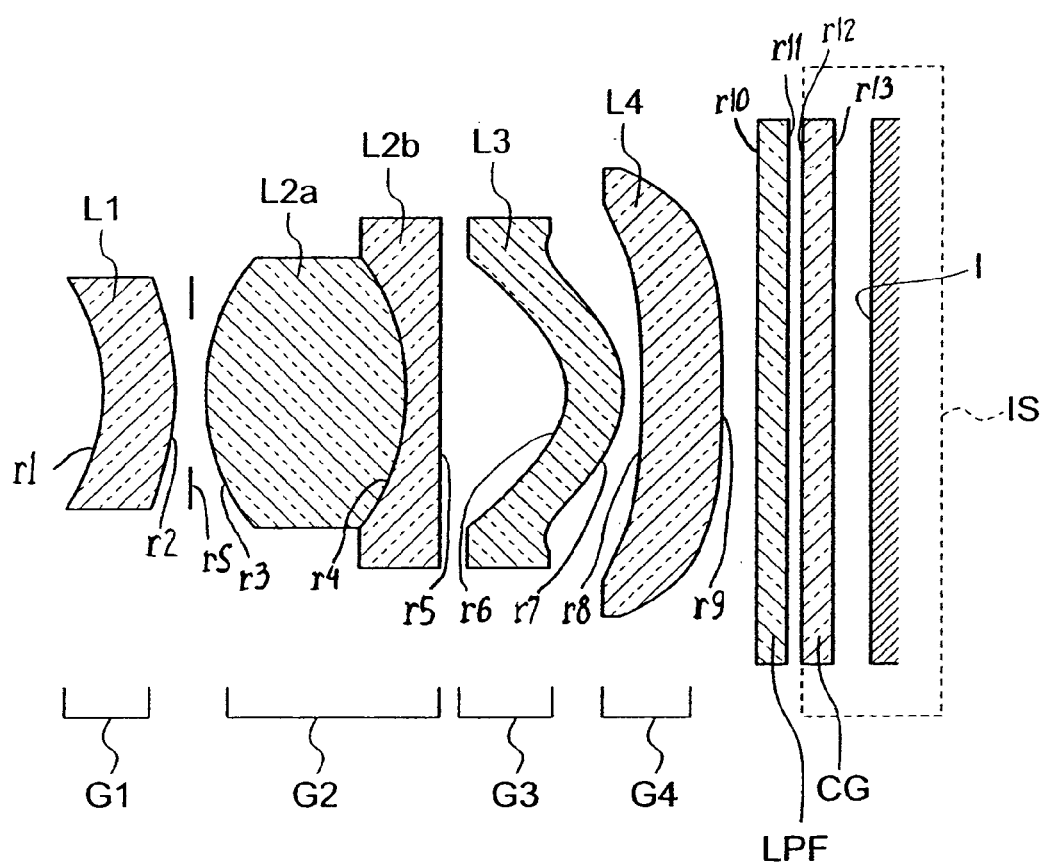
FIG. 9 is a sectional view of an imaging apparatus including an imaging lens according to the fifth embodiment of the present invention, which is taken along the optical axis direction.
Figures 10A, 10B, 10C:
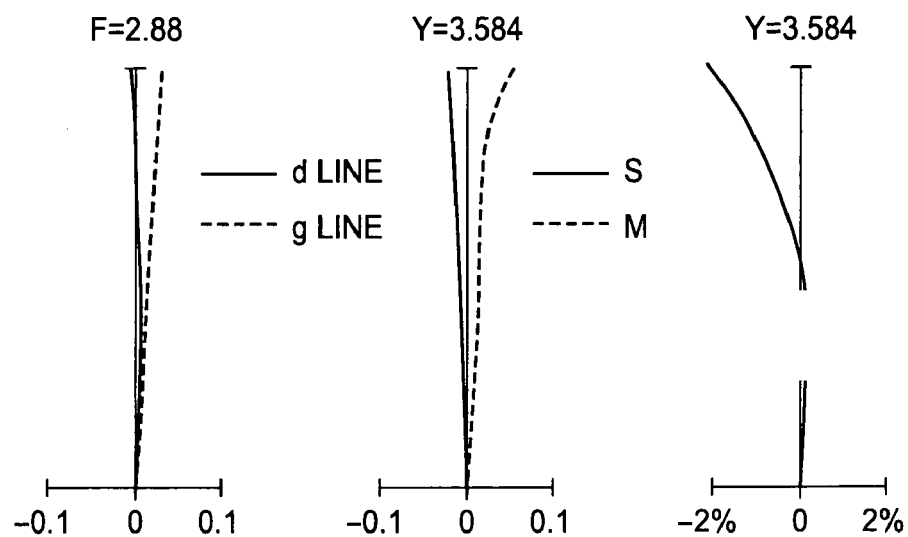
FIGS. 10A to 10E are aberration diagrams showing spherical aberration (FIG. 10A), astigmatism (FIG. 10B), distortion (FIG. 10C), and coma (FIGS. 10D and 10E) in the fifth embodiment shown in FIG. 9.
Figure 10D:
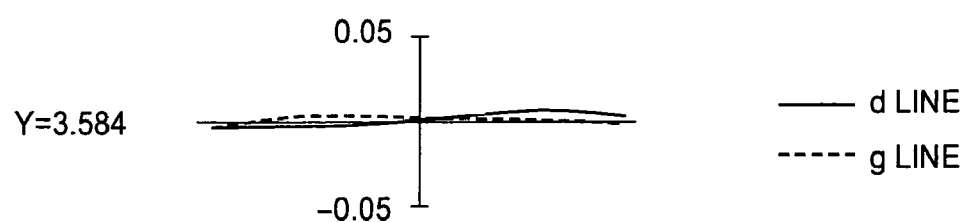
Figure 10E:
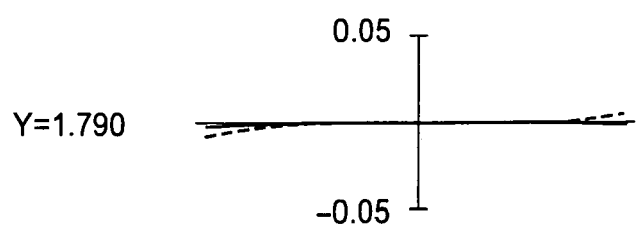

FIG. 9 is a sectional view of an imaging apparatus including an imaging lens according to the fifth embodiment of the present invention which is taken along the optical axis direction. Referring to FIG. 9, the imaging lens sequentially includes, from the object side, an aperture stop S, first lens group G1, second lens group G2, third lens group G3, and fourth lens group G4. The first lens group G1 is comprised of only a first lens L1 having a meniscus shape with its concave surface facing the object side. The second lens group G2 has positive refracting power as a whole, and sequentially includes, from the object side, a 2-1st lens L2a having positive refracting power and a 2-2nd lens L2b cemented to the 2-1st lens -L2a and having negative refracting power. The third lens group G3 is comprised of only a third lens L3 having a meniscus shape with its concave surface facing the object side. The fourth lens group G4 is comprised of only a fourth lens L4.

The image sensing device is comprised of this imaging lens, an infrared cut filter IRCF having an infrared cut coating formed on the object-side surface, a cover glass (parallel plate) CG of a solid-state image sensing device IS, and the solid-state image sensing device IS such as a CMOS or CCD.

An optical image which has passed through the imaging lens, the infrared cut filter IRCF, the cover glass CG of the solid-state image sensing device IS and formed on an imaging plane I is photoelectrically converted by the solid-state image sensing device IS and further subjected to predetermined processing to be converted into an image signal.

In the imaging lens suitable for the imaging apparatus according to the fifth embodiment shown in FIG. 9, a focal length f, an F-number F, and a value $2\omega$ of an angle of view are set as follows:

Focal length: f=6.30

F-number: 2.88

Angle of view: $2\omega = 61.5°$

Table 5 shows the lens data of the imaging lens according to the fifth embodiment. FIGS. 10A to 10E are aberration diagrams showing the spherical aberration (FIG. 10A), astigmatism (FIG. 10B), distortion (FIG. 10C), and coma (FIGS. 10D and 10E) of the fifth embodiment. In the fifth embodiment, the first lens L1, third lens L3, and fourth lens L4 are made of a polyolefin-based material. Each lens has a saturation water absorption of 0.01% or less. The 2-1st lens L2a and 2-2nd lens L2b are made of a glass material and cemented to each other.

TABLE 5

| | r | d | nd | vd |
|---|---|---|---|---|
| 1 | −2.589 | 1.00 | 1.52500 | 56.0 |
| 2 | −3.717 | 0.20 | | |
| Stop | ∞ | 0.30 | | |
| 3 | 3.807 | 2.82 | 1.77250 | 49.6 |
| 4 | −3.247 | 0.50 | 1.80518 | 25.4 |
| 5 | −108.582 | 1.78 | | |
| 6 | −1.383 | 0.80 | 1.52500 | 56.0 |
| 7 | −1.527 | 0.28 | | |
| 8 | −17.905 | 1.14 | 1.52500 | 56.0 |
| 9 | −191.940 | 0.50 | | |
| 10 | ∞ | 0.40 | 1.51633 | 64.1 |
| 11 | ∞ | 0.20 | | |
| 12 | ∞ | 0.50 | 1.51633 | 64.1 |
| 13 | ∞ | | | |

Aspherical Surface Coefficient

First Surface $K=-1.78123$ $A_4=1.53449\times10^{-3}$ $A_6=1.02054\times10^{-4}$ $A_8=-1.22333\times10^{-6}$ Second Surface $K=1.54880\times10^{-2}$ $A_4=8.41192\times10^{-3}$ $A_6=-5.80279\times10^{-5}$ $A_8=2.79449\times10^{-5}$ Sixth Surface $K=-1.44086$ $A_4=-5.28384\times10^{-2}$ $A_6=9.44615\times10^{-3}$ $A_8=1.93019\times10^{-3}$ $A_{10}=-4.16332\times10^{-4}$ Seventh Surface $K=-9.16098\times10^{-1}$ $A_4=-9.38012\times10^{-4}$ $A_6=2.19031\times10^{-3}$ $A_8=1.06223\times10^{-3}$ $A_{10}=-8.94564\times10^{-5}$ Eighth Surface $K=3.81666\times10^{-1}$ $A_4=-3.43659\times10^{-3}$ $A_6=-6.72019\times10^{-5}$ $A_8=-5.99934\times10^{-5}$ $A_{10}=-7.68731\times10^{-6}$ $A_{12}=2.1546\times10^{-6}$ Ninth Surface $K=1.00000\times10^{-2}$ $A_4=-1.24178\times10^{-2}$ $A_6=7.55020\times10^{-4}$ $A_8=-8.14150\times10^{-5}$ $A_{10}=1.80050\times10^{-6}$ $A_{12}=8.60850\times10^{-10}$ (Sixth Embodiment)

Figure 11:
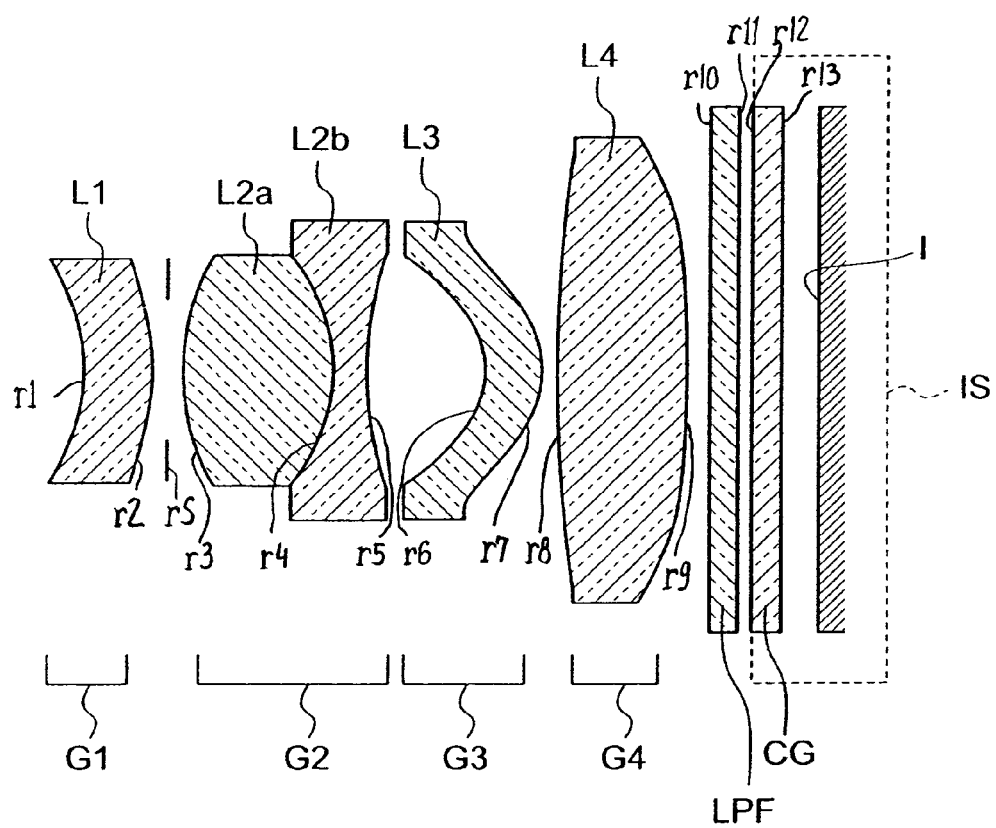
FIG. 11 is a sectional view of an imaging apparatus including an imaging lens according to the sixth embodiment of the present invention, which is taken along the optical axis direction.
Figures 12A, 12B, 12C:
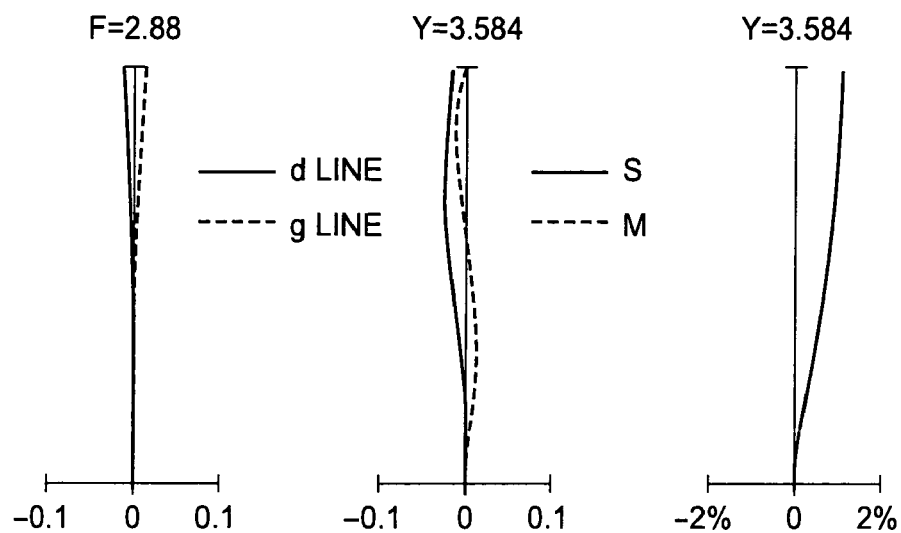
FIGS. 12A to 12E are aberration diagrams showing spherical aberration (FIG. 12A), astigmatism (FIG. 12B) distortion (FIG. 12C), and coma (FIGS. 12D and 12E) in the sixth embodiment shown in FIG. 11.
Figure 12D:
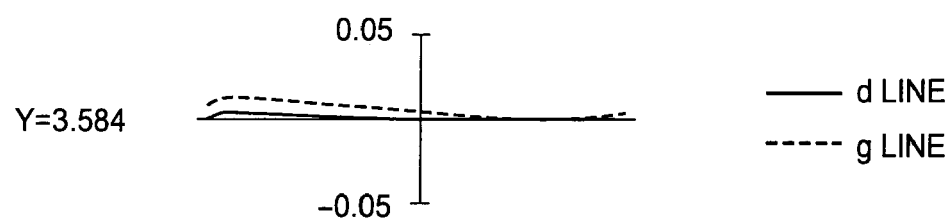
Figure 12E:
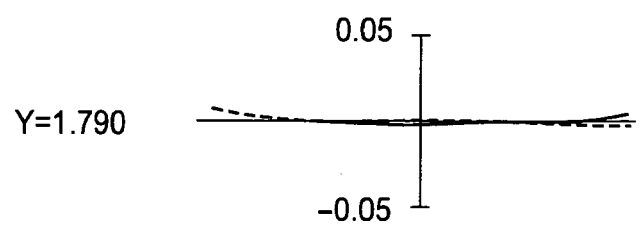

FIG. 11 is a sectional view of an imaging apparatus including an imaging lens according to the sixth embodiment of the present invention which is taken along the optical axis direction. Referring to FIG. 11, the imaging lens sequentially includes, from the object side, an aperture stop S, first lens group G1, second lens group G2, third lens group G3, and fourth lens group G4. The first lens group G1 is comprised of only a first lens L1 having a meniscus shape with its concave surface facing the object side. The second lens group G2 has positive refracting power as a whole, and sequentially includes, from the object side, a 2-1st lens L2a having positive refracting power and a 2-2nd lens L2b cemented to the 2-1st lens L2a and having negative refracting power. The third lens group G3 is comprised of only a third lens L3 having a meniscus shape with its concave surface facing the object side. The fourth lens group G4 is comprised of only a fourth lens L4.

The image sensing device is comprised of this imaging lens, an infrared cut filter IRCF having an infrared cut coating formed on the object-side surface, a cover glass (parallel plate) CG of a solid-state image sensing device IS, and the solid-state image sensing device IS such as a CMOS or CCD.

An optical image which has passed through the imaging lens, the infrared cut filter IRCF, the cover glass CG of the solid-state image sensing device IS and formed on an imaging plane I is photoelectrically converted by the solid-state image sensing device IS and further subjected to predetermined processing to be converted into an image signal.

In the imaging lens suitable for the imaging apparatus according to the sixth embodiment shown in FIG. 11, a focal length f, an F-number F, and a value $2\grave{u}$ of an angle of view are set as follows:

Focal length: f=6.30

F-number: 2.88

Angle of view: 2ω=58.2°

Table 6 shows the lens data of the imaging lens according to the sixth embodiment. FIGS. 12A to 12E are aberration diagrams showing the spherical aberration (FIG. 12A), astigmatism (FIG. 12B), distortion (FIG. 12C) and coma (FIGS. 12D and 12E) of the sixth embodiment. In the sixth embodiment, the first lens L1, third lens L3, and fourth lens L4 are made of a polyolefin-based material. Each lens has a saturation water absorption of 0.01% or less. The 2-1st lens L2a and 2-2nd lens L2b are made of a glass material and cemented to each other.

TABLE 6

|   | r | d | nd | ν |
|---|---|---|---|---|
| 1 | −2.765 | 1.00 | 1.52500 | 56.5 |
| 2 | −3.014 | 0.15 | | |
| Stop | ∞ | 0.25 | | |
| 3 | 3.756 | 2.20 | 1.78590 | 44.2 |
| 4 | −3.000 | 0.50 | 1.74077 | 27.8 |
| 5 | 5.487 | 1.72 | | |
| 6 | −1.635 | 0.85 | 1.52500 | 56.0 |
| 7 | −1.687 | 0.20 | | |
| 8 | 36.282 | 1.88 | 1.52500 | 56.0 |
| 9 | −34.743 | 0.35 | | |
| 10 | ∞ | 0.40 | 1.51633 | 64.1 |
| 11 | ∞ | 0.20 | | |
| 12 | ∞ | 0.50 | 1.51633 | 64.1 |
| 13 | ∞ | | | |

Aspherical Surface Coefficient

First Surface $K=1.95571\times10^{-1}$ $A_4=7.74149\times10^{-3}$ $A_6=9.31856\times10^{-6}$ $A_8=1.82163\times10^{-4}$ Second Surface $K=-4.766950\times10^{-1}$ $A_4=3.03025\times10^{-3}$ $A_6=-2.75262\times10^{-4}$ $A_8=6.79822\times10^{-5}$ Sixth Surface $K=-3.14713$ $A_4=-9.56571\times10^{-2}$ $A_6=1.68808\times10^{-2}$ $A_8=1.00757\times10^{-4}$ $A_{10}=6.89535\times10^{-5}$ $A_{12}=-5.12878\times10^{-5}$ Seventh Surface $K=-7.60430\times10^{-1}$ $A_4=-1.58680\times10^{-3}$ $A_6=-2.10354\times10^{-3}$ $A_8=1.90493\times10^{-3}$ $A_{10}=-3.25846\times10^{-5}$ $A_{12}=-1.57450\times10^{-5}$ Eighth Surface $K=8.07509\times10^{-1}$ $A_4=2.59424\times10^{-3}$ $A_6=-4.99096\times10^{-4}$ $A_8=3.87317\times10^{-5}$ $A_{10}=-7.18905\times10^{-7}$ $A_{12}=-1.09581\times10^{-8}$ Ninth Surface $K=-1.00000\times10^{-2}$ $A_4=-3.87683\times10^{-3}$ $A_6=-3.35510\times10^{-4}$ $A_8=7.30023\times10^{-5}$ $A_{10}=-5.64493\times10^{-6}$ $A_{12}=1.68662\times10^{-7}$ Table 7 summarizes the values of respective conditional expressions (1) to (7) according to the above-described embodiments.

TABLE 7

| | First Embodiment | Second Embodiment | Third Embodiment | Fourth Embodiment | Fifth Embodiment | Sixth Embodiment |
|---|---|---|---|---|---|---|
| Focal Length f | 6.30 | 5.80 | 6.30 | 6.30 | 6.30 | 6.30 |
| F number | 2.88 | 2.88 | 2.88 | 2.88 | 2.88 | 2.88 |
| Expression (1) f12/f | 1.08 | 1.14 | 1.52 | 1.36 | 0.84 | 1.05 |
| Expressions (2) and (3) f2/f | 1.27 | 1.27 | 2.53 | 3.48 | 0.79 | 1.23 |
| Expression (4) TL/f | 1.72 | 1.79 | 1.64 | 1.66 | 1.69 | 1.67 |
| Expression (5) ν21 | 49.6 | 49.6 | 54.7 | 56.0 | 49.6 | 44.2 |
| Expression (6) ν22 | 26.5 | 25.4 | 23.8 | 30.0 | 25.4 | 27.8 |
| Expression (7) 2Y/EP | 0.71 | 0.83 | 0.78 | 0.71 | 0.78 | 0.63 |

The several preferred embodiments of the present invention have been described. Obviously, however, the present invention should not be interpreted as limited to the respective embodiments, and can be properly changed and improved. Although the imaging apparatus of the present invention is preferably mounted on portable terminals such as compact digital still cameras, cellular phone sets, and PDAs, they can be used for other applications such as personal computer cameras.

What is claimed is:

1. An imaging lens system comprising:
a first lens group consisting of a first-first lens, in which the first-first lens has a concave surface facing an object side;
a second lens group having positive refracting power as a whole, said second lens group consisting of a second-first lens having positive refracting power and a second-second lens having negative refracting power, the second-first lens and the second-second lens are sequentially arranged from the object side, and the second-second lens is cemented to or separated from the second-first lens;

a third lens group consisting of a third-first lens, in which the third-first lens has a meniscus shape with a concave surface facing the object side; and a fourth lens group consisting of a fourth-first lens, wherein the above lens groups are sequentially arranged from the object side and said imaging lens system has a single fixed focal length.

2. The system of claim 1, wherein an aperture stop is placed on the object side of said first lens group.

3. The system of claim 1, wherein an aperture stop is placed between said first lens group and said second lens group.

4. The system of claim 1, wherein the second-first lens has a biconvex shape, the second-second lens has a biconcave shape, and each of said third-first lens and said fourth-first lens has at least one aspherical surface.

5. The system of claim 1, wherein the following inequality is satisfied:

$$0.5 < f12/f < 2.0 \qquad (1)$$

where f12 is a composite focal length of said first lens group and said second lens group, and f is the focal length of the whole imaging lens system.

6. The system of claim 1, wherein the following inequality is satisfied:

$$0.5 < f2/f < 4.0 \qquad (2)$$

where f2 is a focal length of said second lens group, and f is the focal length of the whole imaging lens system.

7. The system of claim 1, wherein the following inequalities are satisfied:

$$0.5 < f2/f < 3.0 \qquad (3)$$

$$1.0 < TL/f < 2.5 \qquad (4)$$

where f2 is a focal length of said second lens group, f is the focal length of the whole imaging lens system, and TL is a total length of said imaging lens, the total length comprising an on-axis distance from a lens surface located nearest to the object side to an image-side focal point of the whole image lens system or in an imaging lens having an aperture stop placed nearest to the object side, an on-axis distance from a surface of the aperture stop which is located nearest to the object side to an image-side focal point of the whole imaging lens system.

8. The system of claim 1, wherein the following inequalities are satisfied:

$$40 < v21 < 85 \qquad (5)$$

$$20 < v22 < 35 \qquad (6)$$

where v21 is an Abbe number of the 2-1st lens with respect to a d-line, and v22 is an Abbe number of the 2-2nd lens with respect to a d-line.

9. The system of claim 1, wherein the following inequality is satisfied:

$$0.0 < 2Y/EP < 1.5 \qquad (7)$$

where 2Y is an effective screen diagonal length of a solid-state image sensing device, and EP is an on-axis distance from an exit pupil of the whole imaging lens system to an image-side focal point of the whole imaging lens system.

10. The system of claim 1, wherein each of lenses forming said first lens group, said third lens group, and said fourth lens group includes at least one aspherical surface.

11. The system of claim 1, wherein said imaging lens system is a five element/four group imaging lens system.

12. An imaging apparatus comprising an imaging lens system and a solid-state image sensing device, wherein the image lens system comprises:

a first lens group consisting of a first-first lens, in which the first-first lens has a concave surface facing an object side;

a second lens group having positive refracting power as a whole, said second lens group consisting of a second-first lens having positive refracting power and a second-second lens having negative refracting power, the second-first lens and the second-second lens are sequentially arranged from the object side, and the second-second lens is cemented to or separated from the second-first lens;

a third lens group consisting of a third-first lens, in which the third-first lens has a meniscus shape with a concave surface facing the object side; and a fourth lens group consisting of a fourth-first lens, wherein the above lens groups are sequentially arranged from the object side and said imaging lens system has a single fixed focal length.

13. The apparatus of claim 12, wherein an aperture stop is placed on the object side of said first lens group.

14. The apparatus of claim 12, wherein an aperture stop is placed between said first lens group and said second lens group.

15. The apparatus of claim 12, wherein the second-first lens has a biconvex shape, the second-second lens has a biconcave shape, and each of said third-first lens and said fourth-first lens has at least one aspherical surface.

16. The apparatus of claim 12, wherein the following inequality is satisfied:

$$0.5 < f12/f21\ 2.0 \qquad (1)$$

where f12 is a composite focal length of said first lens group and said second lens group, and f is the focal length of the whole imaging lens system.

17. The apparatus of claim 12, wherein the following inequality is satisfied:

$$0.5 < f2/f < 4.0 \qquad (2)$$

where f2 is a focal length of said second lens group, and f is the focal length of the whole imaging lens system.

18. The apparatus of claim 12, wherein the following inequalities are satisfied:

$$0.5 < f2/f < 3.0 \qquad (3)$$

$$1.0 < TL/f21\ 2.5 \qquad (4)$$

where f2 is a focal length of said second lens group, f is the focal length of the whole imaging lens system, and TL is a total length of said imaging lens, the total length comprising an on-axis distance from a lens surface located nearest to the object side to an 15 image-side focal point of the whole image lens system or in an imaging lens having an aperture stop placed nearest to the object side, an on-axis distance from a surface of the aperture stop which is located nearest to the object side to an image-side focal point of the whole imaging lens system.

19. The apparatus of claim 12, wherein the following inequalities are satisfied:

$$40 < \nu21 < 85 \quad (5)$$

$$20 < \nu22 < 35 \quad (6)$$

where ν21 is an Abbe number of the 2-1st lens with respect to a d-line, and ν22 is an Abbe number of the 2-2nd lens with respect to a d-line.

20. The apparatus of claim 12, wherein the following inequality is satisfied:

$$0.0 < 2Y/EP < 1.5 \quad (7)$$

where 2Y is an effective screen diagonal length of the solid-state image sensing device, and EP is an on-axis distance from an exit pupil of the whole imaging lens system to an image-side focal point of the whole imaging lens system.

21. The apparatus of claim 12, wherein each of lenses forming said first lens group, said third lens group, and said fourth lens group includes at least one aspherical surface.

22. The apparatus of claim 12, wherein said imaging lens system is a five element/four group imaging lens system.

* * * * *